United States Patent [19]

Whitledge

[11] E Re. 29,801

[45] Reissued *Oct. 17, 1978

[54] SWAGING APPARATUS

[75] Inventor: Jon K. Whitledge, Mantua, Ohio

[73] Assignee: Samuel Moore And Company, Aurora, Ohio

[*] Notice: The portion of the term of this patent subsequent to Jan. 15, 1991, has been disclaimed.

[21] Appl. No.: 845,577

[22] Filed: Oct. 26, 1977

Related U.S. Patent Documents

Reissue of:

[64] Patent No.: 3,858,298
Issued: Jan. 7, 1975
Appl. No.: 313,792
Filed: Dec. 11, 1972

U.S. Applications:

[63] Continuation-in-part of Ser. No. 216,093, Jan. 7, 1972, Pat. No. 3,785,050.

[51] Int. Cl.[2] ..... B23P 19/02

[52] U.S. Cl. ..... 29/237; 29/263

[58] Field of Search ..... 29/237, 263, 251, 256, 29/282, 283; 72/454

[56] References Cited

U.S. PATENT DOCUMENTS

| | | | |
|---|---|---|---|
| 1,929,245 | 10/1933 | Harvey | 72/454 |
| 2,863,346 | 12/1958 | Cobaugh et al. | 72/404 |
| 2,916,812 | 12/1959 | Milo | 29/237 |
| 3,028,987 | 4/1962 | Van Hecke | 72/454 |
| 3,048,212 | 8/1962 | Morrison | 29/237 |
| 3,142,113 | 7/1964 | Cloud | 29/263 |
| 3,373,474 | 3/1968 | Doerer | 29/237 |
| 3,785,050 | 1/1974 | Whitledge et al. | 29/237 |

FOREIGN PATENT DOCUMENTS

| | | | |
|---|---|---|---|
| 21,049 of | 1915 | United Kingdom | 29/237 |

*Primary Examiner*—James L. Jones, Jr.
*Attorney, Agent, or Firm*—Stevens, Davis, Miller & Mosher

[57] ABSTRACT

A hand actuated swaging device for securing a metallic fitting to an end of a hose has a one-piece cast frame with an integral die support. A ball screw and ball nut assembly is supported by the frame. The screw carries a pusher which presses a fitting into a swaging die without rotation with the screw. *A generally triangularly shaped clamp is provided which is pivotally secured at its apex to side support members and having an arcuate shaped base disposed to press the die into an opening through an end member of the frame.*

1 Claim, No Drawings

SWAGING APPARATUS

Matter enclosed in heavy brackets [ ] appears in the original patent but forms no part of this reissue specification; matter printed in italics indicates the additions made by reissue.

This application is a continuation-in-part of [our] application Ser. No. 216,093 filed Jan. 7, 1972, now Patent No. 3,785,050.

This invention relates generally to apparatus for securing a fitting to an end of a hose and more particularly to a hand actuated hose coupling apparatus.

An apparatus for securing a fitting to an end of a hose is disclosed in U.S. Pat. No. 3,048,212. The disclosed apparatus has been found advantageous for swaging a metallic coupling to the end of a hose but it is heavy and must be secured to a bench or the like. An improvement over the apparatus disclosed in the aforesaid patent is described in [our] *the above* copending application. The apparatus described in the copending application is lightweight and easily transported from place to place. However, it has a frame fabricated by welding which does not have the aesthetic appeal advantageous in a commercial apparatus and which might fail in use because of breaking of a welded joint.

It is therefore an object of this invention to provide an apparatus for securing a coupling to an end of a hose which is light of weight and easily transported from place to place and is devoid of the foregoing disadvantages. Another object of the invention is to provide a hand actuated apparatus for securing a coupler to an end of a hose having improved aesthetic appeal and a frame of improved strength. A more specific object of the invention is to provide a hand operated swaging device which is small enough to be held by an operator while being used, is adapted to be carried from place to place and has a frame of improved strength and aesthetic appeal. Still another object of the invention is to provide an improved means for securing segmented swaging die against movement during swaging.

Other objects will become apparent from the following description with reference to the accompanying drawing wherein FIG. 1 is a front elevation, partially in section, of an embodiment of the invention;

Figure 1:
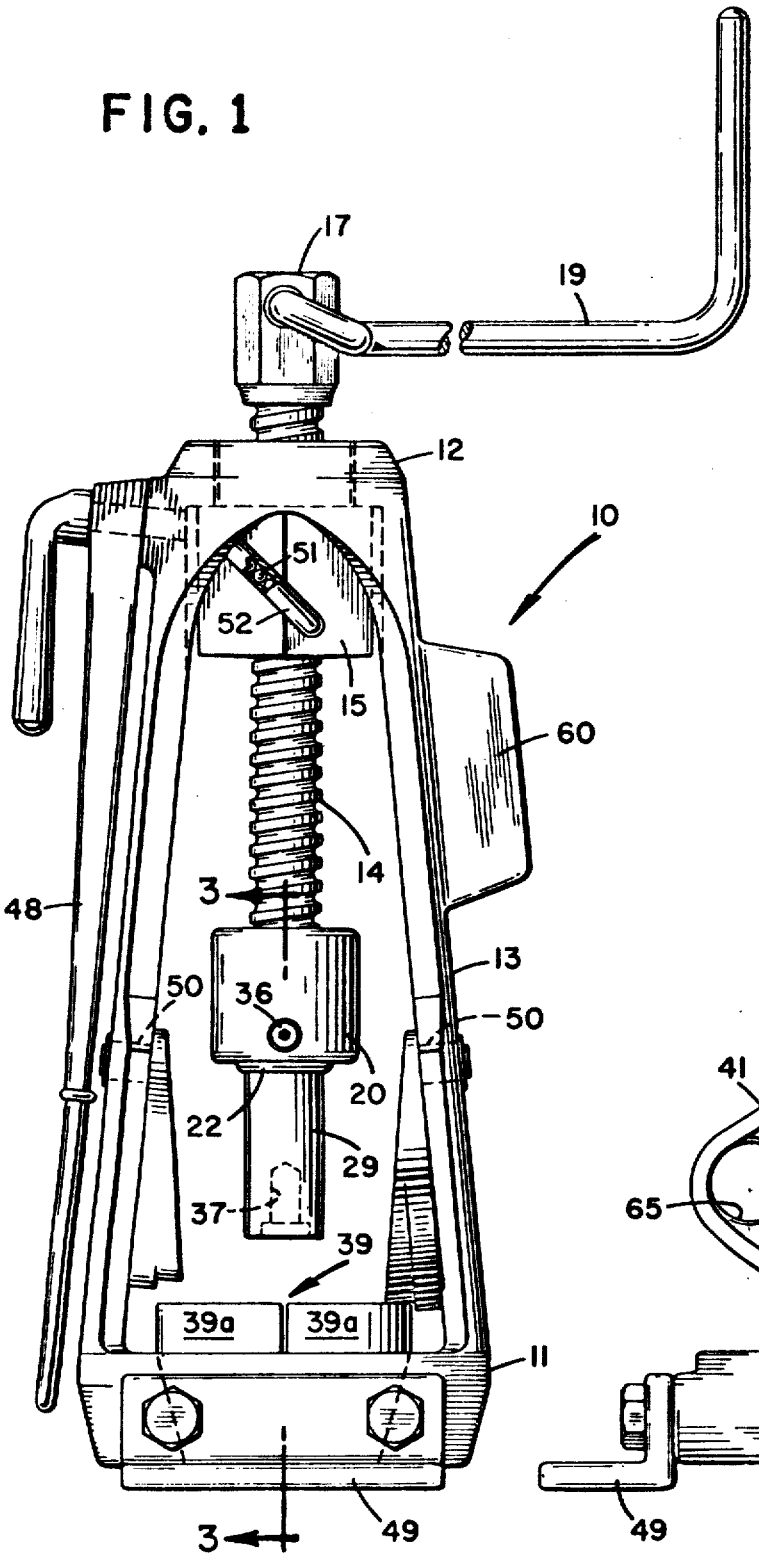
Figure 2:
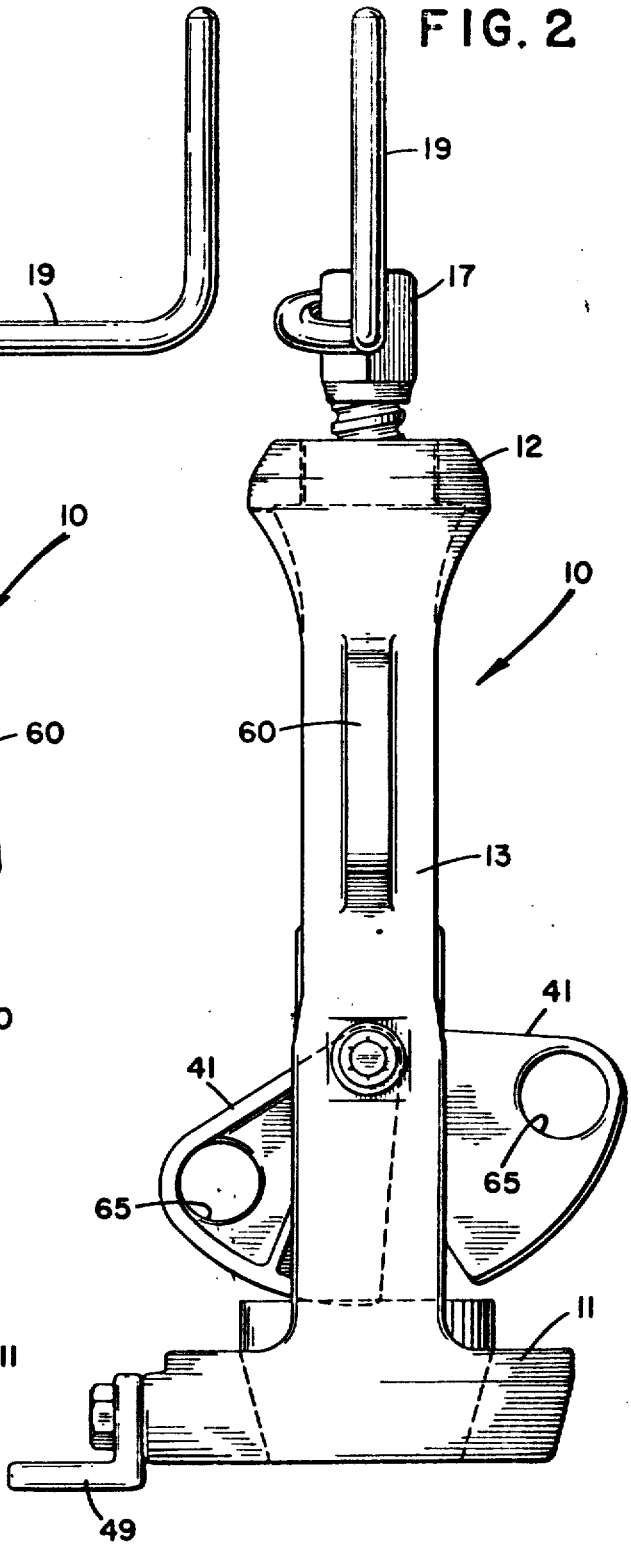
FIG. 2 is a side elevation of the embodiment of FIG. 1.
Figure 3:
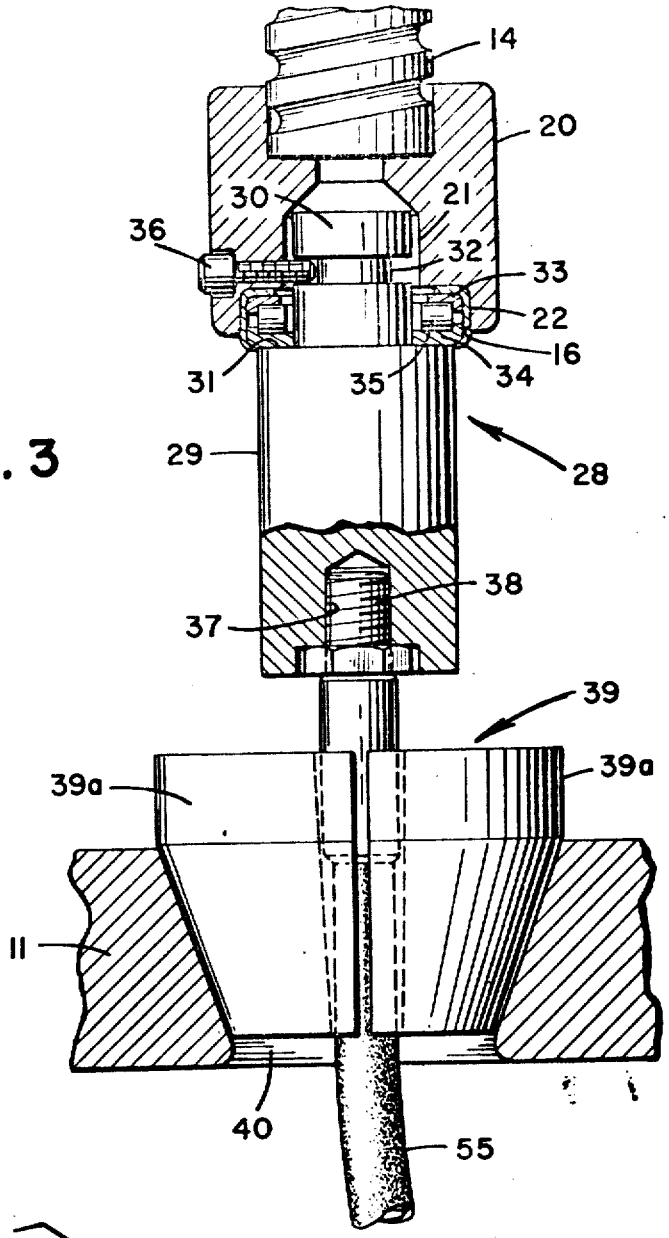
FIG. 3 is an enlarged elevation, partially in section, of an embodiment of a pusher and die assembly.

The foregoing objects and others are accomplished in accordance with this invention, generally speaking, by providing a swaging device for securing a coupler or other fitting to an end of a hose having a cast one-piece frame supporting a ball screw and ball nut assembly carrying a pusher adapted to press the fitting into a die and impart the configuration of the die cavity thereto as it is secured to the hose. The friction normally associated with a conventional nut and screw is eliminated so the force required to turn the screw for swaging is minimized. A thrust bearing carried by a pusher holder imparts thrust to the pusher without rotation as the fitting is pressed into the die cavity.

The frame used to support the swaging members is cast in one-piece with a die base having a bore therein to support a swaging die and an opening in the top for passage of the screw. The opening through the top and the bore of the base can be accurately aligned in all castings by proper fabrication of the casting die whereas proper alignment of these openings in a welded structure is difficult and presents a problem each time a frame is made. The frame may be cast from steel or any suitable metal but it is preferred to use aluminum or magnesium because of the relatively light-weight thereof. The cross-section of the top is smaller than the cross-section of the base, the top and base combine with bar-shaped upstanding sides to impart a substantially frusto-conical configuration to the frame.

Referring to the drawing, a one-piece cast aluminum frame 10 has a base 11, a top 12 and upstanding support members 13. Frame 10 has a substantially frusto--conical shape. A ball screw 14 and a ball nut 15 are supported by frame 10 with screw 14 passing through an opening in top 12 and with ball nut 15 fixed against rotation and end thurst to top 12. A nut 17 secured against relative rotation on the upper end of screw 14 has a bore therethrough adapted for insertion of a crank 19 for use in turning screw 14.

A pusher holder 20 is carried by screw 14. Pusher holder 20 is press fit on the lower end of screw 14.

A pusher 28 has a body portion 29, an upstanding boss 30 and a shoulder 31. Boss 30 is enclosed in a bore 21 in pusher holder 20. A set screw 36 and an annular groove 32 in boss 30 prevent pusher 28 from moving longitudinally with respect to pusher holder 20.

A thrust bearing 22 is press fit in a counter bore 16 which communicates with bore 21. Upper race 33 and lower race 34 enclose circumferentially spaced bearings 35 and space elements therebetween. Lower race 34 is disposed on shoulder 31. Upper race 33 rotates with pusher holder 20.

Bore 37 in the lower end of pusher body 29 is adapted to hold a fitting 38. Lower race 34 and pusher 28 are free to rotate with pusher holder 20 until friction between fitting 38 and swaging die 39 stops the rotation.

Swaging die 39 is supported in an opening 40 through base 11. Opening 40 has the configuration of an inverted frusto-cone. Die 39 is split longitudinally into two equal segments 39A which are adapted to fit snugly in opening 40 when assembled into a frusto-conically shaped die.

Figure 4:
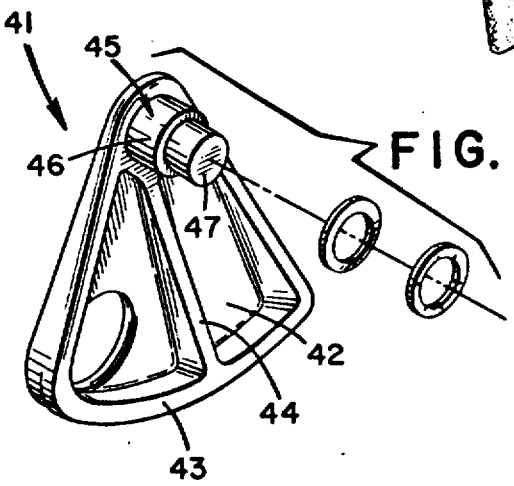
FIG. 4 is a perspective view of a clamp for securing the die in the base of the apparatus.

A cast die clamp 41 is pivotally secured to each member 13 above base 11 and is adapted to secure die segments 39A in opening 40. Clamp 41 may be a casting having a back 42 with a reinforcing rim 43 and longitudinal reinforcing rib 44. A boss 45 carried by the top of clamp 41 has a base portion 46 and a projection post 47 of smaller cross-section. Boss 45 passes through opening 50 in member 13 and is secured therein. A spring washer and retainer ring may be disposed on post 47 to pivotally secure boss 45 in opening 50 (FIG. 4). The periphery of the base of clamp 41 is arcuate shaped and has an inner downwardly protruding flange which adapts it to act as a cam and press segments 39A in opening 40 of base 11 as it is pivoted about its eccentric axis. Hole 65 is provided for insertion of a finger therein when moving clamp 41.

A leverage arm 48 may be pivotally secured to a member 13 near the top of frame 10. An L-shaped bracket 49 may be bolted or otherwise secured to base 11 for use in securing the swager to a bench while it is being used.

A conventional ball screw 14 and ball nut 15 may be used. Ball screw 14 has helical threads having a rounded base which combine with rounded internal threads of ball nut 15 of the same pitch to form a helical bearing race for balls 51. An external tubular passage 52 secured to ball nut 15 provides for transfer of balls 51 leaving one end of ball nut 15 to the helical passageway beginning at the opposite end of nut 15.

An elongated tab 60 may be cast on a member 13 to be used to secure the device in a vise in any desired position.

In operation, bracket 49 may be secured in a suitable vise to support the swaging apparatus. A split die 39 having a die cavity of suitable dimensions for swaging a fitting 38 is placed in opening 40 in die base 11. Clamps 41 are pivoted inwardly until they press against die members 39A and secure them in bore 40. A pusher element 28 having a cavity 37 adapted to hold the fitting 38 to be swaged on a hose is inserted through thrust bearing 22 and set screw 36 is turned until it extends into groove 32. The dimensions of pusher 28 and the depth of penetration of set screw 36 are such that pusher 28 is not thereby secured to pusher holder 20 for rotation with screw 14. A hose 55 with a fitting 38 on one end is inserted through the opening in die 39 and inserted in the cavity 37 of pusher 28. Crank handle 19 is turned. Screw 14 rotates in nut 15 and pusher holder 20 is rotated therewith as it moves towards die 39. The force of the rotating screw 14 is transferred to the non-rotating pusher through the rotating rollers of thrust bearing 22. Fitting 38 is forced downwardly into the cavity in die 39 and swaged about the end of hose 55. The direction of rotation of crank 19 is reversed to move pusher 28 away from die 39. Clamps 41 are moved away from die 39 and the die and swaged fitting may be removed from the bore 40 in base 11. The segments of die 39 separate to release the swaged fitting.

If a vise is not availale, the swaging machine may be secured to a bench or it may be held by leverage arm 48 to prevent rotation as ball screw 14 is turned. The base 11 may be placed on the floor or on a table top in such an operation or one man can hold the frame and leverage arm while the other rotates the crank handle.

Any suitable means may be provided for turning the screw in the ball nut. For example, a conventional socket and ratchet may be substituted for the crank 19 shown in the drawing.

The size of the apparatus need not be great to provide the torque required to swage a fitting on a hose. For example, a one-inch diameter ball screw about 7.5 inches long may be supported on a suitable cast frame of the type illustrated in the drawing to provide an overall length of the apparatus of less than 15 inches when the pusher is resting on the swaging die. Such an apparatus is relatively light in weight and adapted to be moved from place to place.

Suitable ball screw and ball nut assemblies are available commercially. Any suitable one of these may be used. For example, one of the type disclosed in U.S. Pat. No. 2,836,075 may be used.

Any suitable conventional thrust bearing may be used. One which has been used to advantage is a Type TTSP, Number T-77 Tinken Bearing.

The cast one-piece frame 10 is lightweight and free from the disadvantage of welded parts breaking apart in use. Moreover, accurate alignment of the opening through the top and base of the frame can be obtained. The one-piece cast frame also has more aesthetic appeal than a welded structure. *The generally triangularly shaped clamp pivotally secured at its apex to each of the side support members, and having an arcuate shaped base disposed to press the die into the opening through the said second end member of the frame, is especially effective for the intended purpose.*

Although the invention has been described in detail for the purpose of illustration, it is to be understood that such detail is solely for that purpose and that variations may be made by those skilled in the art without departing from the spirit and scope of the invention except as it may be limited by the claims.

The embodiments of the invention in which an exclusive property or privilege is claimed are defined as follows:

[1. An apparatus for securing a fitting to a hose which comprises a ball screw and ball nut assembly, a swaging die having a die cavity adjacent one end of the screw with the cavity aligned with the screw, means for supporting said ball nut and said die against relative longitudinal movement and against rotation with the screw comprising a cast one-piece frame having a first end member, a second end member spaced longitudinally from the first end member and a pair of laterally spaced side support members integral at one end thereof with the said first end member and integral at the other end with the said second end member, an opening through the said first end member and an opening through the second end member for supporting the swaging die, said openings having a common axis, said ball screw passing through said opening through the first end member and said ball nut secured to said first end member, means carried by said end of the screw for pressing a fitting and hose assembly in said die cavity comprising a holder element secured to the said screw end for rotation therewith and having a cavity therein, a pusher element having one end in the cavity of the holder element and an opposite end adapted to support a fitting and hose assembly as it is moved towards the die cavity, means for securing the pusher element in the cavity of the holder element against rotation with the screw and against substantial longitudinal movement relative to the screw comprising a thrust bearing in the cavity of the holder element and about the said pusher, and means for turning the screw in the nut.]

[2. The apparatus of claim 1, wherein the die is segmented.]

[3. The apparatus of claim 1, having a leverage arm pivotally secured to the frame for supporting the apparatus.]

[4. The apparatus of claim 1 comprising a generally triangularly shaped clamp pivotally secured at its apex to each of said side support members and having an arcuate shaped base disposed to press the die into the opening through the said second end member of the frame.]

*5. An apparatus for securing a fitting to a hose which comprises a ball screw and ball nut assembly, a swaging die having a die cavity adjacent one end of the screw with the cavity aligned with the screw, means for supporting said ball nut and said die against relative longitudinal movement and against rotation with the screw comprising a cast one-piece frame having a first end member, a second end member spaced longitudinally from the first end member and a pair of laterally spaced side support members integral at one end thereof with the said first end member and integral at the other end with the said second end member, an opening through the said first end member and an*

*opening through the second end member for supporting the swaging die, said openings having a common axis, said ball screw passing through said opening through the first end member and said ball nut secured to said first end member, means carried by said end of the screw for pressing a fitting and hose assembly in said die cavity comprising a holder element secured to the said screw end for rotation therewith and having a cavity therein, a pusher element having one end in the cavity of the holder element and an opposite end adapted to support a fitting and hose assembly as it is moved towards the die cavity, means for securing the*

*pusher element in the cavity of the holder element against rotation with the screw and against substantial longitudinal movement relative to the screw comprising a thrust bearing in the cavity of the holder element and about the said pusher, a generally triangularly shaped clamp pivotally secured at its apex to each of said side support members and having an arcuate shaped base disposed to press the die into the opening through the said second end member of the frame, and means for turning the screw in the nut.*

* * * * *

UNITED STATES PATENT OFFICE

CERTIFICATE OF CORRECTION

Patent No. Reissue 29,801 Dated October 17, 1978

Inventor(s) Jon K. Whitledge

It is certified that error appears in the above-identified patent and that said Letters Patent are hereby corrected as shown below:

Below the Abstract, change "1 Claim, No Drawings" to read -- 1 Claim, 4 Figure Drawings --.

Add Figures 1 through 4 of the Drawings as shown on the attached sheets.

On the title page, add Figure as shown below.

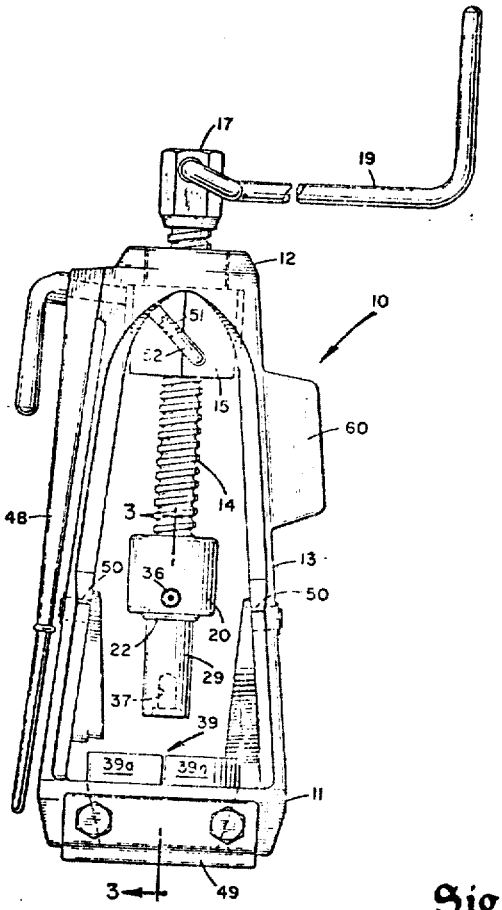

Signed and Sealed this

Twenty-seventh Day of February 1979

[SEAL]

Attest:

RUTH C. MASON
Attesting Officer

DONALD W. BANNER
Commissioner of Patents and Trademarks